United States Patent [19]

Takahashi

[11] Patent Number: 4,770,550
[45] Date of Patent: Sep. 13, 1988

[54] AUTOMATICALLY TILTABLE SMALL ROLLER STRUCTURE OF SLIDE BEARING TYPE

[76] Inventor: Shigeo Takahashi, No. 21-16, Soshigaya 1-chome, Setagaya-ku, Tokyo-to, Japan

[21] Appl. No.: 93,625

[22] Filed: Sep. 8, 1987

[30] Foreign Application Priority Data

Mar. 19, 1987 [JP] Japan .................... 62-40148

[51] Int. Cl.$^4$ ............ F16C 23/08; F16C 13/06; B65H 20/02; B65H 27/00
[52] U.S. Cl. ................ 384/495; 226/194; 242/76; 384/49
[58] Field of Search ........... 226/194; 242/76; 384/49, 58, 445, 449, 456, 490, 495–498, 513, 516, 543, 546–549, 558, 587

[56] References Cited

U.S. PATENT DOCUMENTS

| | | | |
|---|---|---|---|
| 840,010 | 1/1907 | Ragsdale | 384/546 |
| 1,160,592 | 11/1915 | Goldman | 384/497 |
| 1,973,064 | 9/1934 | Gwinn | 384/497 |
| 2,150,796 | 3/1939 | Brouwer et al. | 384/498 |
| 3,907,234 | 9/1975 | Sato et al. | 226/194 X |
| 4,122,985 | 10/1978 | Nelson | 226/194 X |
| 4,518,134 | 5/1985 | Oishi et al. | 226/194 X |
| 4,541,557 | 9/1985 | Fell et al. | 226/194 X |

Primary Examiner—Stuart S. Levy
Assistant Examiner—Thomas R. Hannon
Attorney, Agent, or Firm—Martin Smolowitz

[57] ABSTRACT

An automatically tiltable small roller structure, which comprises a shaft, a small roller including an elastic rubber cylinder and a sleeve, and a plurality of bearing balls. The sleeve is integral with the inner periphery of the elastic rubber cylinder, and mainly composed of polytetrafluoroethylene (fluoroplastics). The shaft is fitted in the roller structure. The bearing balls are fitted in a circumferential or annular groove formed on the shaft, and are provided such that they are in rolling contact with the inner periphery of the roller and the outer periphery of the shaft in the groove. The groove is provided at a middle point between the opposite ends of the roller. The depth of the groove is set such that the bearing balls project slightly from the groove, so that a slight gap is formed between the inner periphery of the roller and the outer periphery of the shaft. The axes of the roller and shaft are thus slightly tiltable in relation to each other.

10 Claims, 4 Drawing Sheets

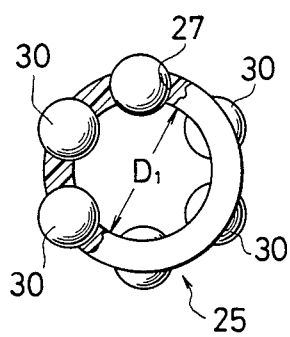
FIG.4
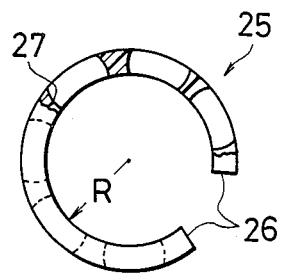
FIG.5
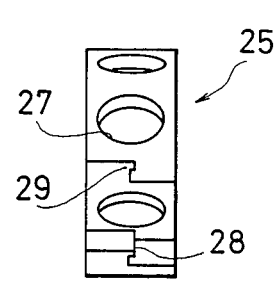
FIG.6
FIG.8
FIG.7
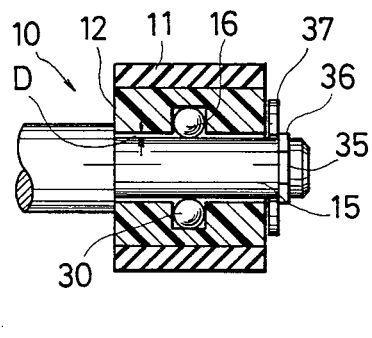
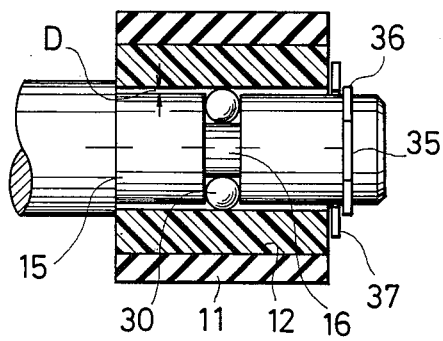
FIG.9
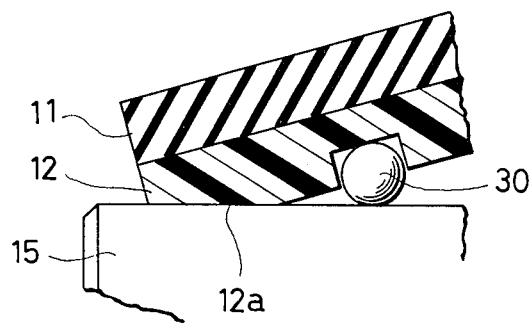

AUTOMATICALLY TILTABLE SMALL ROLLER STRUCTURE OF SLIDE BEARING TYPE

BACKGROUND OF THE INVENTION

1. Field of the Invention

This invention relates to guide rollers and pinch rollers for guiding tapes of tape recorders and video tape recorders, and also other small rollers used for guiding soft tapes and printer tapes of computers, word processors, etc.

2. Prior Art

FIG. 10 shows a small roller A, which may be used as a guide roller or a pinch roller for guiding magnetic tapes of a tape recorder or a video tape recorder. The small roller A consists of a light metal cylinder 1 and an elastic rubber layer 2 provided thereon. The light metal cylinder 1, which may be made of aluminum, is fitted on a shaft 3 via a super-small ball bearing 4 or a radial bearing. Oil seals 5 are provided on the opposite sides of ball bearing 4. The small roller A is automatically tiltable in a small range of about 1° or below with respect to the shaft 3.

Although a super-small ball bearing 4 of high precision has recently been manufactured by mass production, it does not meet user's requiement as to production costs. Further, because it is a type of radial bearing, it does not meet optimum requirements by users especially in having a automatically tiltable property. The reason why the radial bearings are utilized in this field is only that they happen to provide an automatic tilting action, although the action is done at a relatively narrower range.

Further, since the radial ball bearings require inner and outer rings 6 and 7, it is impossible to reduce the outer diameter of such rollers, and therefore, it is impossible to substantially reduce the size of apparatus utilizing these ball bearings.

Recently, rollers using tetrafluoride resins as bearing material have been announced. However, such rollers are incapable of automatic tilting because they are of slide bearing support type, and hence they can not be used as small rollers of the said type requiring automatic tilting property.

Further, in the aspect of a PV value and coefficient of friction, materials having high mechanical strength are liable to cause wear of the opposing member, and they also cause heat generation. (The PV value is obtained by multiplying P and V, where P=unit pressure of the shaft on the bearing that is obtained by dividing the load on the bearing by the projected bearing area. V=velocity of wear surface). Materials having low coefficient of friction, on the other hand, have insufficient mechanical strength. Therefore, both of such materials can be hardly used as small rollers of the type noted above.

Particularly, rollers used for guiding video tape recorder tapes have to meet strong demands for high speed rotation, capability of being used for long time, light weight (use of aluminum shaft), freedom from lubrication, prevention of heat generation, low noise and low cost. Development of a small roller which can meet the above demands has been expected in the pertinent field.

SUMMARY OF THE INVENTION

An object of the invention is to provide a small roller of simple construction, which uses fluoroplastics as a main material of the inner periphery of roller, makes use of character of a slide bearing and has an automatic tilting effect.

The small roller of the invention comprises an elastic rubber cylinder and a sleeve which is provided integrally on the inner side of the rubber cylinder and composed of polytetrafluoroethylene (fluoroplastics) as a main component. The small roller is fitted on a shaft, and the shaft or the roller has a circumferential or annular groove. A plurality of bearing balls are provided in this groove such that they can rol over an inner periphery of the small roller and an outer periphery of the shaft. The groove is provided at a position mid way between the opposite ends of the small roller. The groove has a depth such that the bearing balls slightly project from the groove, and a slight gap is formed between the roller inner periphery and the shaft outer periphery. The axes of the two members are slightly tiltable relative to each other, so as to obtain an automatically tiltable small roller structure of slide bearing type, and thereby the problems inherent in the prior art are solved.

With the above construction according to the invention, the roller and the shaft can tilt or rock slightly relative to each other for a range of gap dimension between them about the row of bearing balls, and the roller can rotate about the shaft while they are undergoing instantaneous changes in their relative orientation.

With the above construction and effect, corresponding to forces received externally by them, the roller and the shaft may be supported only by the row of bearing balls contacting a mid portion of the inner periphery of the sleeve, or supported by both the bearing ball row and a portion of the inner periphery of the sleeve which is nearer either one of the two ends of the sleeve. This bearing ball row has an action of a roller bearing and also contributes to obtain an effect of automatic tilting, while the opposite side sleeve portions have an action of a slide bearing. Therefore, great load is not applied solely on the bearing ball row, and wear of components is kept at a lower level. Further, since the circumferential or annular groove is provided mid way between the opposite ends of the roller, the tilting angle range is symmetrical on the opposite sides.

Further, since the roller consists of the elastic rubber cylinder and the sleeve formed directly on the inner side thereof, it is simplified in construction and reduced in weight in comparison to the prior art roller, so that the roller is reduced in inertia. Therefore, there can be provided a small roller suitable for using as a tape guide roller of the tape recorder noted above, which is required to frequently repeat operations of start, stop and reversal and also to be used continuously for long time. Further, as the roller can be reduced in size, it is best suited as a small roller of the said type.

Further, since the inner side of the roller is constituted by the sleeve having low friction coefficient and low wear coefficient, the roller will rotate smoothly and will not be worn partially.

Still further, the gap between the inner periphery of the sleeve and the outer periphery of the shaft can be set freely to get a required inclination angle of automatic tilting, because they are molding parts. Further, the groove in the sleeve can be easily processed to obtain a desired depth prior to assembling according to the diameter of the bearing balls used. Thus, it is possible to ensure very high freedom of design and reduce cost.

BRIEF DESCRIPTION OF THE DRAWINGS

The above objects, features and advantages of the invention will be best understood from the following description with reference to the accompanying drawings, in which:

FIG. 4 is an enlarged-scale plan view showing a retainer with bearing balls fitted therein;

FIG. 5 is a plan view, partly in section, showing the retainer;

FIG. 6 is a side view showing the retainer of FIG. 5;

FIG. 7 is an enlarged-scale front view, partly in section, showing a third embodiment of the invention;

FIG. 8 is an enlarged-scale front view, partly in section, showing a fourth embodiment of the invention;

FIG. 9 is a fragmentary view, partly in section, illustrating exaggeratively the roller of the embodiment of FIG. 8 in a tilted state.

DETAILED DESCRIPTION OF THE PREFERRED EMBODIMENTS

Figure 1:
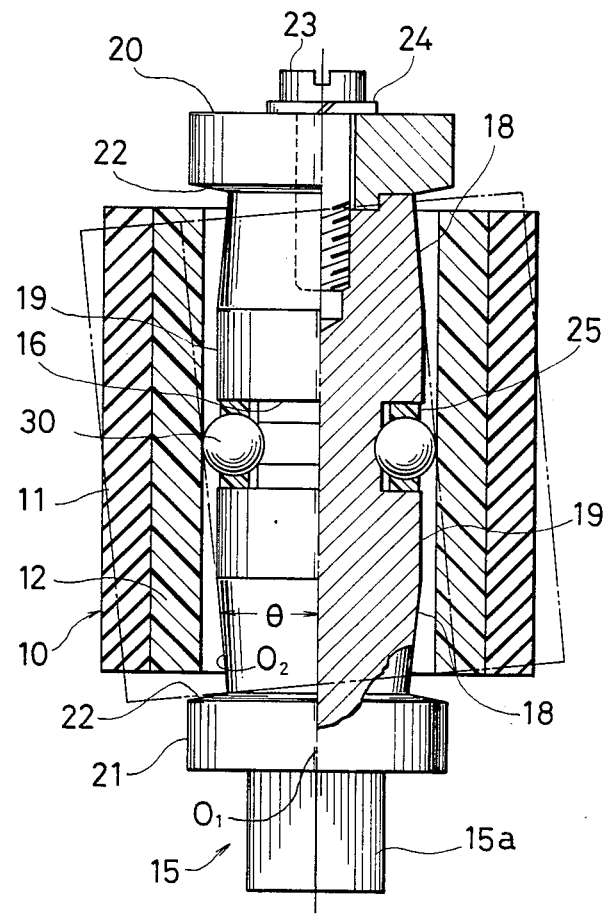
FIG. 1 is an enlarged-scale elevational view, partly in section, showing a first embodiment of the invention.
Figure 2:
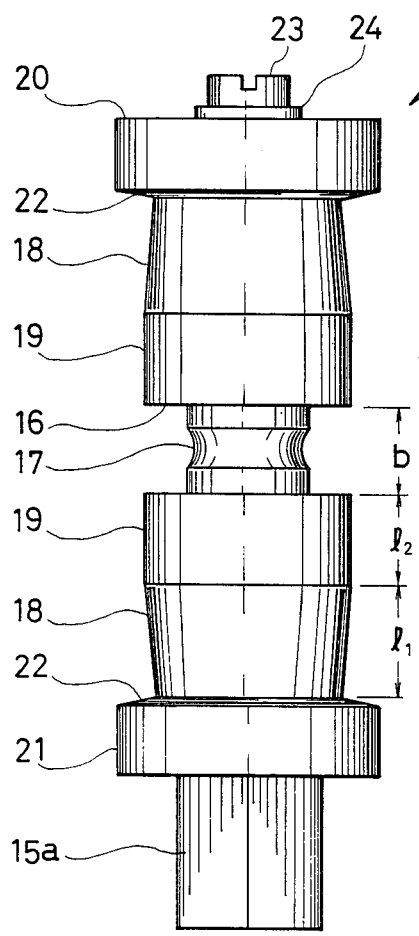
FIG. 2 is an elevational view showing a shaft in the embodiment of FIG. 1.

Now, the invention will be described in conjunction with the illustrated embodiments.

The sleeve used in the invention is composed of polytetrafluoroethylene (fluoroplastics) as a main composition and incorporated with special fillers, and physical properties of the sleeve are shown in Table 1.

TABLE 1

| Physical Property (Unit) | Sample No. 1 | Sample No. 2 |
|---|---|---|
| Density (lbs./ft.$^3$) | 118.6 | 124.8 |
| Hardness (Durometer D) | 63 | 65 |
| Tensile Strength (lbs./in.$^2$) | 995.4 | 2346.3 |
| Tensile Elongation (%) | 100 | 200 |
| Compressive Strength (lbs./in.$^2$) | | |
| 1% deformation | 1094.9 | 1166 |
| 5% deformation | 3598 | 2744 |
| 0.2% offset | 2503 | 1820 |
| Compressive Elastic Modulus (lbs./in.$^2$) | 109494 | 116604 |

The sleeve material used for sample No. 1 had the friction coefficient K;

$$K = 1.4 \times 10^{-11} (\text{in.}^3 \cdot \text{min.})/(\text{lb.} \cdot \text{ft.} \cdot \text{hr.})$$

when the PV value was $28 \times 10^3$ lbs./in.$^2$·ft./min., and the opposing member was an aluminum shaft made of ADC (Aluminum Die Casting)-12, and its hardness was HRC-22 (Hardness in Rockwell C-scale), and its surface roughness Rmax was 0.433 mil to 0.512 mil.

On the other hand, the sleeve material used for sample No. 2 had coefficient of friction K;

$$K = 2.8 \times 10^{-12} (\text{in.}^3 \cdot \text{min.})/(\text{lb.} \cdot \text{ft.} \cdot \text{hr.})$$

when the PV value was $84 \times 10^3$ lbs./in.$^2$·ft./min., and the opposing shaft member was the same as that of sample No. 1.

However, it is sufficient that coefficient of friction K is less than $1.4 \times 10^{-11}$(in.$^3$·min.)/(lb.·ft.·hr.), when the PV value is $28 \times 10^3$ lbs./in.$^2$·ft./min.

As the material for the sleeve meeting the above requirements, there was used "Excelide 9550-No. 5" or "9550-No. 7" of Nichias Co., Ltd. at the time of the present invention, but this material is by no means limitative, and any material may be used so long as the above requirements are met.

The coefficient of friction was calculated on the basis of an equation;

$$K = (W)/(P \cdot V \cdot T \cdot \rho \cdot S)$$

where,
W: Worn-out Weight (lbs.)
P: Load on unit projected area of sample (lbs./in.$^2$)
V: Surface (Peripheral) Velocity (ft./min.)
T: Time (hr.)
$\rho$: Density of sample (lbs./in.$^3$)
S: Projected area of sample (in.$^2$)

EMBODIMENT 1

FIGS. 1, 2, 4 and 6 illustrate a first embodiment of the invention. Reference numeral 10 designates a roller. A surface layer of the roller 10 is constituted by an elastic rubber cylinder 11. An inner layer of the roller 10 consists of a sleeve 12, which is mainly composed of polytetrafluoroethylene having the said physical properties and incorporated with a special filler material. The two members, namely the cylinder 11 and the sleeve 12, may be formed as respective one-piece molding and then subsequently made integral. Alternately, one of these members may be first formed by molding, and then the other member may be formed by insert molding method. The sleeve 12 has a uniform inner diameter over the entire length.

Reference numeral 15 designates a shaft. The shaft 15 has a circumferential or annular groove 16 on a middle portion thereof, which is positioned at a middle point or mid way between the opposite ends of the roller 10 when the shaft 15 is fitted in the roller 10. A plurality of bearing balls 30 are provided in the groove 16 in a row. The row of bearing balls 30 is formed such that the bearing balls 30 are in rolling contact with the inner periphery of the roller 10 and a bottom of the groove 16. The rolling surface of the bottom 17 of the groove 16 has an U-shaped sectional shape, which has a radius equal to that of the bearing ball 30. The groove 16 has a width b which is greater than the diameter of the bearing ball 30.

The shaft 15 has a pair of tapered surface portions 18 which are formed on the opposite sides of the groove 16 and faced to the opposite ends of the roller 10. The diameter of each tapered surface portion 18 becomes greater toward the groove 16 and becomes smaller toward the corresponding end of the roller 10. The angle $\theta$ between a generation line O$_2$ of the tapered surface portion 18 and the axis O, of the shaft 15 may be about 0.5° to 15°. In case of this embodiment, it is set within a range of 0.5° to 5°. Extension surface of each tapered surface portion 18 is in contact with a spherical surface of said bearing balls 30 or slightly inside of the spherical surface.

The shaft 15 is provided with a pair of non-contact shaft portions 19 located between the groove 16 and each tapered surface portion 18. The non-contact shaft portion 19 has a considerably smaller outer diameter than the inner diameter of the roller 10. The ratio between the axial length $l_1$ of tapered surface portion 18 and the axial length $l_2$ of the non-contact shaft portion 19 may be about 1:5 to 5:1, and it is preferably 1:2 to 2:1.

Although the material of the shaft 15 is not limited, but annealed steel or stainless steel are most preferred in view of wear resistance and cost. Aluminum is particularly suitable to reduce the shaft weight and to obtain a required heat radiation property. Brass and other similar material may also be used.

Stainless steel balls, synthetic resin balls and ceramic balls are used as the bearing balls 30 suitably in dependence on the material and hardness of the shaft 15. Usually, balls having substantially the same hardness as the shaft 15 are used.

A retainer 25 for holding the bearing balls 30 at a predetermined interval from one another in the groove 16 of the shaft 15 is of a ring-like form, as shown by FIGS. 4 and 5. More particularly to say, the retainer 25 is opened in the direction at right angles to the axis thereof, so that it has opposite engaging ends 26 which are connected to each other. When no external force is applied to the retainer 25, the radius R of curvature of its inner surface is substantially the same as the radius of the largest diameter portion of the shaft 15. When the engaging ends 26 are connected to each other, the retainer 25 forms a perfect ring. At this time, the inner diameter $D_1$ of the retainer is greater than the diameter of the bottom 17 of the groove 16 of the supporting shaft 15, and the outer diameter of the retainer 25 is smaller than the inner diameter of the roller 10. Ball supporting holes 27 are radially formed in the retainer in a circumferentially spaced relation to one another, such that the bearing balls 30 can be supported at a uniform angular interval.

The material of the retainer 25 is not limited so long as it has slightly elastical deformablity, low coefficient of friction, excellent heat resistance to the friction heat, and low coefficient of thermal expansion. At the time of the application, polyamidoimid (PAI) resins of thermoplastic were best suited.

When the bearing balls 30 are inserted in the ball supporting holes 27, they are capable of sliding rotation in the ball supporting holes 27. The engaging ends 26 of the retainer are provided with a tenon 28 and a mortise 29 respectively, which can be connected by hooking with each other.

The upper end of the supporting shaft 15 is provided with a flange 20, and the lower end of the shaft 15 is provided with a flange 21, each having a diameter greater than the inner diameter of the roller 10 so that the roller 10 will not move vertically. The end surface of each of the flanges 20 and 21 facing on the end surface of the roller 10 has a second tapered surface 22 of an acute angle, which is formed at right angles to the generation line $O_2$ of the tapered surface portion 18. When the roller 10 is inclined or tilted, the ends of the roller 10 will not strike the flanges 20 and 21, but they are supported with the second tapered surfaces 22.

The flange 20 at one end of the shaft 15 is detachably mounted on the shaft 15 by a small bolt 23 screwed into the axis portion of the shaft 15.

In assembling the above components, the retainer 25 is moved axially from one end of the shaft 15 up to the position of the groove 16 by increasing its diameter with making use of its elastic deformation. Then, the tenon 28 and the mortise 29 of the respective engaging ends 26 of the retainer 25 are hooked on each other in the groove 16, so as to obtain the retainer 25 of a perfect ring-like form. Then, the roller 10 is quietly fitted on the shaft 15 from the top end thereof up to a position, at which the roller 10 strikes the flange 21 integral with the shaft 15.

Then, another flange 20 is fitted on the top end of the shaft 15, and the small bolt 23 is screwed via a suitable washer 24, thus securing the flange 20 to the shaft 15.

In using the assembled roller as a tape guide roller of a video tape recorder, an angular stem 15a of the shaft 15 is secured to a particular position of the frame of video tape recorder.

OPERATION AND EFFECTS OF EMBODIMENT 1

When the small roller structure of this embodiment is used, the following operation and effects are obtained in addition to those of the invention.

Since the bearing balls 30 are held by the retainer at a predetermined angular interval in the groove 16 of the shaft 15, they will never be brought into contact with one another on account of their interval changes. They will never be displaced in the groove 16 also in the width direction of the groove 16. Further, since the retainer 25 is made of the material as noted above, even if the bearing balls 30 are in sliding contact with the bearing balls 30 and the supporting shaft 15, friction resistance may be kept at a lower level, and hence, there is no possibility of spoiling mechanical characters, even if heat is generated on the contact portions on account of friction heat.

Further, since the second tapered surfaces 22 on the upper and lower shaft flanges 20 and 21 are formed such that their generation lines incline at right angles to those of the tapered surface portions 18, the ends of the sleeve 11 of the roller 10 are supported by the second tapered surfaces 22 with sliding on the generation lines of the second tapered surfaces 22. Therefore, even if the roller 10 is tilted in relation to the supporting shaft 15, it does not cause to increase the frictional resistance substantially.

Further, since the sleeve 12 made of the above material is fitted into the rubber cylinder 11 in order to constitute the inner periphery of the roller 10, the frictional coefficient is very low. Therefore, even if a tape running speed which is several times (i.e., 3 to 5 times) that of the ordinary video tape recorder known at the time of the application may be adopted, a sufficiently normal operation can be ensured for the permissible life period of the video tape recorder.

Further, when annealed steel is used as the material for the shaft 15, the shaft 15 will not be worn at all. When aluminum is used for the shaft 15, satisfactory heat conduction can be obtained. Therefore, no heat is retained or accumulated on the bearing balls 30 and the taper surface portions 18, and there is no possibility of thermal seizure at all.

The illustrated structure is enlarged in scale. In the case of this embodiment, the actual length of the roller 10 is about 0.196 to 0.787 inch, and the roller 10 has an inner diameter of 0.118 to 0.196 inch and an outer diameter of 0.196 to 0.393 inch, and the bearing ball 30 has a diameter of 39.3 mil to 59 mil, and the shaft has an outer diameter of 0.114 to 0.188 inch at the said non-contact shaft portion 19.

The small roller structure of the sizes noted above was actually rotated at a rotation speed of 2,000 r.p.m. or more, but there was never occured any phenomenon such that would cause thermal seizure or defective rotation.

EMBODIMENT 2

Figure 3:
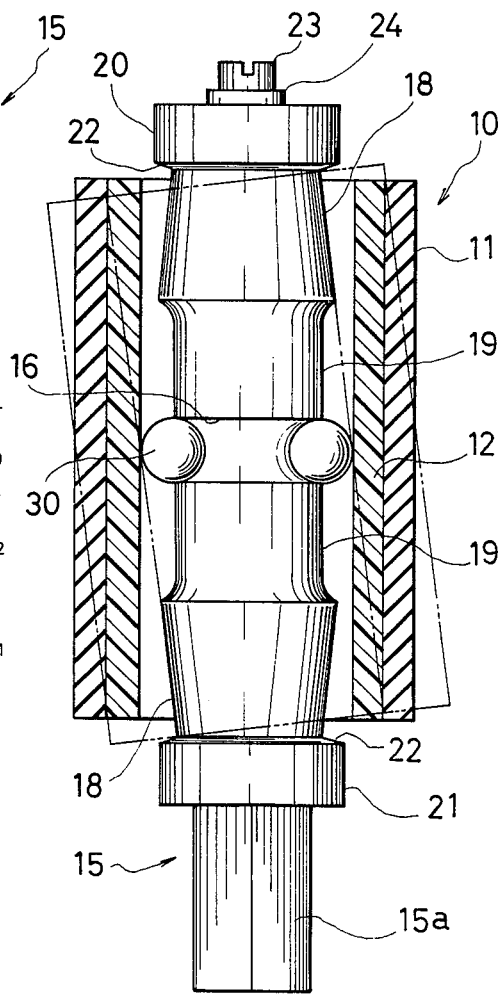
FIG. 3 is an enlarged-scale elevational view, partly in section, showing a second embodiment of the invention without a retainer for bearing balls.
Figure 10:
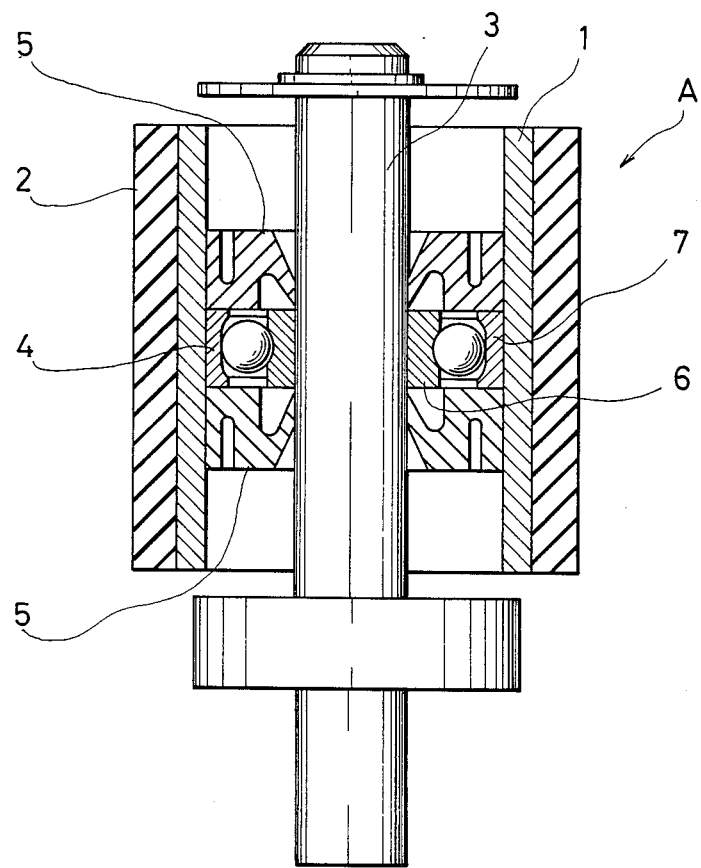
FIG. 10 is an enlarged-scale front view, showing the prior art.

FIG. 3 shows a second embodiment of the invention. In this embodiment, the retainer 25 used in the first embodiment is omitted. Parts designated by the same reference numerals as those in the first embodiment are those having like operation and effects.

In this case, when the same sizes as in the first embodiment were selected, no actual troubles occurred in use at a rotation speed of 2,000 r.p.m. or below.

In each case of the embodiment 1 and the embodiment 2, since an actual contact surface velocity between a shaft and an inner periphery of a guide or pinch roller of usual video tape recorders is relatively low such as 1.125 ins./sec. to 2 ins./sec., and an actual contact surface pressure therebetween is 1.98 lbs. to 3.09 lbs., the rotation speed of the roller is 140 r.p.m. to 204 r.p.m. when the inner diameter of the roller, for example, is 2/16 inches. This value is very low in comparison to the above permissible rotation speed, and hence it is well understood that the small roller structure of the invention has an adequate utility and usefulness.

EMBODIMENT 3

FIG. 7 shows a third embodiment. In this embodiment, the taper surface portions 18 of the shaft 15 are omitted so that the shaft 15 has a uniform diameter except for the groove 16. The gap D between the outer periphery of the shaft 15 and the inner periphery of the roller 10 is set about 4 mil to 8 mil, so that the roller 10 is tiltable by about 1° to either side with respect to the shaft 15.

In order that the roller 10 will not be detached from the shaft 15, a washer 37 is in contact with the end surface of the roller 10, and the washer 37 is held by a spring washer 36 which is fitted on the engagement groove 35 provided at the end of the shaft 15.

In FIG. 7, parts designated by the same reference numerals as those in the first embodiment are those having the same operation and effects of the first embodiment.

A peculiar operation of this embodiment is that the roller 10 is tiltable with respect to the shaft 15 in a range of about 1° until the end of the inner periphery of the roller 10 is brought into contact with the supporting shaft 15.

In this embodiment, since the shaft 15 and inner periphery of the roller 10 are brought into contact with each other only at the opposite ends, the contact surface area is reduced so as to decrease loss by friction.

While the operation is continued for long time, the sleeve 12 constituting the inner periphery of the roller 10 is worn out. After a tapered surface 12a of which diameter increases toward the opposite ends of the roller has been formed as shown in FIG. 9, the contact surface area is also increased, so that subsequent wear is extremely reduced. In this way, when the sleeve 12 is worn out, the tilting angle of the roller 10 with respect to the shaft 15 is increased, but it does not give any inconvenience to the operation of the roller.

EMBODIMENT 4

FIG. 8 shows a fourth embodiment. A peculiar construction of this embodiment is that the inner periphery of the sleeve 12 is formed with a circumferential or annular groove 16 for receiving the bearing balls 30. The sleeve 12 has a uniform inner diameter over the entire length except for the groove 16, and the shaft 15 has a uniform outer diameter over the entire length. The gap D is substantially of the same size as in the third embodiment. Parts designated by the same reference numerals as those in the other embodiments are those having the same operation and effects.

In this embodiment, since the shaft 15 is free from any groove 16, the shaft 15 may be stronger. Therefore, in providing the same mechanical strength of the shaft 15 as in the other embodiments, the diameter of the shaft can be reduced. For the rest, the same effects as in the third embodiment can be obtained.

What is claimed is:

1. An automatically tiltable small roller structure of slide bearing support type, comprising:
   a small roller including an elastic rubber cylinder and a sleeve integral with the inner periphery of said elastic rubber cylinder, said sleeve composed mainly of tetrafluoroethylene;
   a shaft fitted in said small roller, said shaft or said small roller having a circumferential or annular groove;
   a plurality of bearing balls fitted in said groove, said bearing balls being provided such that they are in rolling contact with the inner periphery of said small roller and the outer periphery of said shaft in said groove, said groove being provided at a middle point between the opposite ends of said roller, said groove having a depth such that said bearing balls project slightly from said groove, so that a small gap is formed between the inner periphery of said small roller and the outer periphery of said shaft; and
   a flange or washer is provided on opposite ends of said shaft and having a diameter greater than the inner diameter of the small roller, so that an inner periphery portion of the roller on one side of said bearing balls and another inner periphery portion of the roller on the other side of said balls come into sliding contact with the outer periphery of said shaft alternately, and end surfaces of the roller also come into sliding contact with end surface of said flange or washer, whereby the axes of said roller and shaft are made slightly tiltable relative to each other by an angle of 0.5° to 15°.

2. The automatically tiltable small roller structure according to claim 1, wherein said groove is formed on the outer periphery of said shaft, said shaft has tapered surface portions located on the opposite sides of said groove and adjacent to the opposite ends of said roller, said tapered surface portions each being tapered toward the end of the shaft, the extension surfaces of said tapered surface portions being in contact with or slightly inside of the outer spherical surface of said bearing balls, portions of said shaft between said tapered surface portions and said groove being non-contact portions having a diameter incapable of contact with the inner periphery of said roller.

3. The automatically tiltable small roller structure according to claim 2, wherein the length ratio between said tapered surface and non-contact portion of said shaft is 1:5 to 5:1.

4. The automatically tiltable small roller structure according to claim 2, wherein an angle between a generation line of the tapered surface portion and the axis of said shaft is 0.5° to 5.0°.

5. The automatically tiltable small roller structure according to claim 1, wherein said sleeve material has a coefficient of friction of $1.4 \times 10^{-11}$(in.$^3$·min.)/(lb.·ft.·hr) or below, at a PV value of $84 \times 10^3$ lbs./in$^2$·ft./min., when said fluorplastic sleeve composed mainly of polytetrafluoroethylene is fitted on an aluminum shaft and its surface roughness Rmax is 0.433 to 0.512 mil, and its hardness is HRC-22 or below.

6. The automatically tiltable small roller structure according to claim 1, wherein said shaft is made of one member of a group consisting of annealed steel, aluminum, stainless steel and brass.

7. The automatically tiltable small roller structure according to claim 1, wherein said sleeve material has a coefficient of friction between $1.4 \times 10^{-11}$ and $2.8 \times 10^{-12}$(in.$^3$·min/lb. ft. hr.) at a PV value of $18 \times 10^3$ to $84 \times 10^3$(lb/in.$^3$·ft/min.), said fluorocarbon sleeve being composed mainly of tetrafluoroethylene fitted on an aluminum shaft having surface roughness of 0.433 to 0.512 mil and hardness not exceeding HRC-22.

8. An automatically tiltable small roller structure of slide bearing support type, the structure comprising:
a small roller including an elastic rubber cylinder and a sleeve integral with the inner periphery of said elastic rubber cylinder, said sleeve composed mainly of polytetrafluoroethylene;
a shaft fitted in said small roller, said shaft being provided with an annular groove located at a middle point between the opposite ends of said roller, said shaft being provided with a pair of first tapered surface portions on the opposite sides of said groove and adjacent the opposite ends of the roller, with the diameter of the first tapered surface portion becoming greater toward the groove;
a plurality of bearing balls fitted in said groove, said bearing balls being provided such that they are in rolling contact with the inner periphery of said small roller and the outer periphery of said shaft in said groove, said groove having a depth such that said bearing balls project slightly from said groove, so that a small gap is formed between the inner periphery of said roller and the outer periphery of said shaft, said gap allowing said roller to tilt relatively in the shaft at an angle in a range of 0.5° to 5°; and
a pair of flanges provided at opposite ends of said shaft and having a diameter greater than the inner diameter of the small roller, said flange being provided with a second tapered surface portion on its end surface, said second tapered surface portion being formed at right angles to a generation line of the first tapered surface portion, whereby an inner periphery portion of the roller on one side of said bearing balls and another inner periphery portion of the roller on the other side of said balls can come into sliding contact with each of said first tapered surface portions of the shaft alternately, and end surfaces of said roller also come into sliding contact with said second tapered surface portion of the flange.

9. An automatically tiltable small roller structure of slide bearing type, the structure comprising:
a small roller including an elastic rubber cylinder and a sleeve integral with the inner periphery of said elastic rubber cylinder, said sleeve being composed mainly of polytetrafluoroethylene and having an annular groove provided at a middle point between the opposite ends of said roller;
a shaft fitted in said small roller, said shaft having a flange surface provided at each end of the shaft; and
a plurality of bearing balls fitted in said groove, said bearing balls being provided such that they are in rolling contact with the inner periphery of said groove in said sleeve and with an outer periphery of said shaft, said groove having a depth such that the bearings project inwardly slightly from the groove, so that a slight gap is formed between the inner periphery of said small roller and the outer periphery of said shaft, so that an inner periphery portion of the roller on one side of said bearing balls and another inner periphery portion of said roller on the other side of said balls can come into sliding contact with the outer periphery of the shaft alternately, whereby the axes of the roller and the shaft are made slightly tiltable relative to each other by an angle of about 0.5°-5°.

10. An automatically tiltable small roller structure of slide bearing type according to claim 9, wherein said gap is 4–8 mil and the tiltable angle is about 1° on either side of the shaft axis.

* * * * *